United States Patent
Liu et al.

(10) Patent No.: US 11,161,924 B2
(45) Date of Patent: Nov. 2, 2021

(54) POLYETHYLENE COPOLYMER RESINS AND FILMS

(71) Applicant: Univation Technologies, LLC, Houston, TX (US)

(72) Inventors: Bo Liu, Lake Jackson, TX (US); Mark G. Goode, South Charleston, WV (US); Ayush A. Bafna, Manvel, TX (US); Daniel C. Garska, Angleton, TX (US); François Alexandre, Saint-Leonard (CA); Timothy R. Lynn, Glen Gardner, NJ (US)

(73) Assignee: Univation Technologies, LLC, Houston, TX (US)

( * ) Notice: Subject to any disclaimer, the term of this patent is extended or adjusted under 35 U.S.C. 154(b) by 18 days.

(21) Appl. No.: 16/651,364

(22) PCT Filed: Oct. 9, 2018

(86) PCT No.: PCT/US2018/054908
§ 371 (c)(1),
(2) Date: Mar. 27, 2020

(87) PCT Pub. No.: WO2019/083716
PCT Pub. Date: May 2, 2019

(65) Prior Publication Data
US 2020/0262951 A1    Aug. 20, 2020

Related U.S. Application Data

(60) Provisional application No. 62/578,069, filed on Oct. 27, 2017.

(51) Int. Cl.
| | |
|---|---|
| *C08F 2/34* | (2006.01) |
| *C08F 210/16* | (2006.01) |
| *C08F 210/02* | (2006.01) |
| *C08F 4/24* | (2006.01) |
| *C08F 210/14* | (2006.01) |
| *C08J 5/18* | (2006.01) |
| *C08F 210/08* | (2006.01) |

(52) U.S. Cl.
CPC .............. *C08F 210/02* (2013.01); *C08F 2/34* (2013.01); *C08F 4/24* (2013.01); *C08F 210/14* (2013.01); *C08J 5/18* (2013.01); *C08F 210/08* (2013.01); *C08F 210/16* (2013.01); *C08J 2323/04* (2013.01)

(58) Field of Classification Search
None
See application file for complete search history.

(56) References Cited

U.S. PATENT DOCUMENTS

| | | | |
|---|---|---|---|
| 2,825,721 A | 3/1958 | Hogan et al. | |
| 3,023,203 A | 2/1962 | Dye | |
| 3,324,101 A | 6/1967 | Baker et al. | |
| 3,622,251 A | 11/1971 | Allen | |
| 3,704,287 A | 11/1972 | Johnson | |
| 3,709,853 A | 1/1973 | Karapinka | |
| 4,003,712 A | 1/1977 | Miller | |
| 4,011,382 A | 3/1977 | Levine et al. | |
| 4,100,105 A | 7/1978 | Levine et al. | |
| 4,302,566 A * | 11/1981 | Karol .............. | C08F 210/16 526/124.6 |
| 4,453,399 A | 6/1984 | Thompson | |
| 4,482,687 A | 11/1984 | Noshay et al. | |
| 4,543,399 A | 9/1985 | Jenkins, III et al. | |
| 4,588,790 A | 5/1986 | Jenkins, III et al. | |
| 4,675,369 A * | 6/1987 | Cook ................ | C08F 10/00 526/129 |
| 4,882,400 A | 11/1989 | Dumain et al. | |
| 4,910,271 A * | 3/1990 | Bailly .............. | C08F 10/02 526/106 |
| 4,988,783 A | 1/1991 | Beran et al. | |

(Continued)

FOREIGN PATENT DOCUMENTS

| | | |
|---|---|---|
| BE | 839380 | 9/1976 |
| EP | 0649992 | 7/1997 |
| EP | 0794200 | 9/1997 |
| EP | 634421 | 10/1997 |
| EP | 0802202 | 10/1997 |
| EP | 1778769 | 5/2007 |
| EP | 2174961 | 4/2010 |
| EP | 2692746 | 11/2016 |
| WO | 1993003093 | 2/1993 |
| WO | 2004101674 | 11/2004 |

(Continued)

OTHER PUBLICATIONS

Leal, New Results on the Correlation Molecular Architecture-Melt Elasticity-Blowing Process-Film Properties for Conventional and Metallocene-Catalyzed Polyethylenes, Macromolecular Materials and Engineering, 2009, pp. 670-676, vol. 291, Issue 6.

(Continued)

*Primary Examiner* — Richard A Huhn

(57) ABSTRACT

An ethylene/alpha-olefin copolymer that can be synthesized in a fluidized-bed, gas phase polymerization reactor and made into a blown film. The ethylene/alpha-olefin copolymer is characterized by a bubble stability-effective combination of properties comprising density, melt flow ratio ("$I_{21}/I_5$"), and melt storage modulus G' (G"=3,000 Pa). The synthesis in the FB-GPP reactor is characterized by a property-imparting-effective combination of operating conditions comprising reactor bed temperature and H2/C2 gas molar ratio. An embodiment of the blown film consisting of the ethylene/alpha-olefin copolymer is characterized by enhanced bubble stability. A method of making the ethylene/alpha-olefin copolymer. A film comprising the ethylene/alpha-olefin copolymer. A method of making the film. A manufactured article comprising the film.

13 Claims, No Drawings

(56) References Cited

U.S. PATENT DOCUMENTS

| | | | |
|---|---|---|---|
| 4,994,534 A | 2/1991 | Rhee et al. | |
| 5,008,204 A | 4/1991 | Stehling | |
| 5,332,706 A * | 7/1994 | Nowlin | C08F 210/16 502/107 |
| 5,352,749 A | 10/1994 | DeChellis et al. | |
| 5,420,220 A * | 5/1995 | Cheruvu | C08F 10/02 428/402 |
| 5,462,999 A | 10/1995 | Griffin et al. | |
| 5,541,270 A | 7/1996 | Chinh et al. | |
| 5,602,067 A * | 2/1997 | Nowlin | C08J 5/18 502/104 |
| 5,608,019 A * | 3/1997 | Cheruvu | C08J 5/18 526/129 |
| 5,627,242 A | 5/1997 | Jacobsen et al. | |
| 5,665,818 A | 9/1997 | Tilston et al. | |
| 5,677,375 A | 10/1997 | Rifi et al. | |
| 6,022,933 A | 2/2000 | Wright et al. | |
| 6,245,868 B1 * | 6/2001 | Agapiou | B01J 8/0005 524/855 |
| 6,420,580 B1 * | 7/2002 | Holtcamp | C08F 210/16 556/11 |
| 6,489,408 B2 | 12/2002 | Mawson et al. | |
| 6,696,379 B1 * | 2/2004 | Carnahan | C07F 5/068 502/102 |
| 6,723,805 B2 | 4/2004 | Braganca et al. | |
| 6,828,395 B1 * | 12/2004 | Ehrman | C08F 10/00 525/191 |
| 6,987,152 B1 * | 1/2006 | Eisinger | C08F 210/16 526/77 |
| 6,989,344 B2 | 1/2006 | Cann et al. | |
| 6,995,235 B1 * | 2/2006 | Ehrman | C08F 210/16 526/114 |
| 7,078,467 B1 * | 7/2006 | Kolb | C08F 10/00 526/160 |
| 7,238,765 B2 | 7/2007 | Lee et al. | |
| 7,504,467 B2 | 3/2009 | Ochs | |
| 7,511,109 B2 | 3/2009 | Arnoux et al. | |
| 7,714,072 B2 | 5/2010 | Michie, Jr. et al. | |
| 7,754,834 B2 * | 7/2010 | Pequeno | C08F 10/00 526/126 |
| 7,897,710 B2 | 3/2011 | Amos et al. | |
| 8,227,552 B2 | 7/2012 | Kolb et al. | |
| 8,497,329 B2 | 7/2013 | Kolb et al. | |
| 8,637,615 B2 | 1/2014 | Li et al. | |
| 8,706,665 B2 | 4/2014 | Andre | |
| 9,243,091 B2 | 1/2016 | Moineau et al. | |
| 9,550,847 B2 | 1/2017 | Bell et al. | |
| 2002/0150648 A1 | 10/2002 | Cree | |
| 2006/0155081 A1 | 7/2006 | Jorgensen et al. | |
| 2006/0173123 A1 | 8/2006 | Yang et al. | |
| 2011/0109388 A1 | 5/2011 | Touzard et al. | |
| 2011/0218307 A1 * | 9/2011 | Goode | C08F 210/16 526/113 |
| 2012/0101235 A1 * | 4/2012 | Crowther | C08F 210/16 525/319 |
| 2013/0123440 A1 | 5/2013 | Samples et al. | |
| 2013/0216835 A1 | 8/2013 | Moineau et al. | |
| 2013/0337210 A1 * | 12/2013 | Aliyev | C08F 2/34 428/36.92 |
| 2014/0024789 A1 * | 1/2014 | Ker | C08L 23/06 526/113 |
| 2014/0030460 A1 | 1/2014 | Monoi et al. | |
| 2014/0350199 A1 * | 11/2014 | Kuo | C08F 210/16 526/90 |
| 2014/0357817 A1 * | 12/2014 | Hoang | C08F 4/6592 526/130 |
| 2014/0357818 A1 * | 12/2014 | Hoang | C08F 10/00 526/130 |
| 2014/0357819 A1 * | 12/2014 | Hoang | C08F 10/00 526/161 |
| 2014/0378632 A1 * | 12/2014 | Hoang | C08F 4/6494 526/129 |
| 2015/0094433 A1 * | 4/2015 | Hoang | C08F 10/02 526/129 |
| 2015/0099856 A1 * | 4/2015 | Hoang | C08F 4/76 526/129 |
| 2015/0183905 A1 * | 7/2015 | Savatsky | C08F 210/16 526/118 |
| 2016/0297907 A1 * | 10/2016 | Goode | C08L 23/08 |
| 2016/0340454 A1 * | 11/2016 | Funk | C08F 210/16 |
| 2016/0347874 A1 * | 12/2016 | Boiler | B32B 27/32 |
| 2016/0347878 A1 * | 12/2016 | Ker | C08F 2/001 |
| 2017/0190816 A1 | 7/2017 | Al-Enazi | |
| 2017/0210891 A1 * | 7/2017 | Kapur | B65D 53/00 |
| 2017/0233506 A1 * | 8/2017 | Moorhouse | B01J 37/26 502/107 |
| 2017/0247482 A1 * | 8/2017 | Moorhouse | C08F 10/02 |
| 2017/0260306 A1 * | 9/2017 | Moorhouse | B01J 37/082 |
| 2017/0274356 A1 * | 9/2017 | Cann | B01J 37/16 |
| 2018/0118861 A1 * | 5/2018 | Sandell | C08L 23/0815 |
| 2018/0155473 A1 * | 6/2018 | Kuhlman | C08F 210/02 |
| 2018/0171049 A1 * | 6/2018 | Lue | C08F 2500/04 |
| 2018/0194868 A1 * | 7/2018 | Hamed | C08F 2/34 |
| 2018/0237554 A1 * | 8/2018 | Holtcamp | C08F 2/34 |
| 2018/0298128 A1 * | 10/2018 | Harlan | C08L 23/0815 |
| 2018/0305473 A1 * | 10/2018 | Schwerdtfeger | B01J 35/1023 |
| 2018/0346623 A1 * | 12/2018 | Lam | C08F 4/65916 |
| 2019/0119417 A1 * | 4/2019 | Li | C08F 2/44 |
| 2019/0127502 A1 * | 5/2019 | Holtcamp | C08J 5/18 |
| 2019/0144576 A1 * | 5/2019 | Lue | C08J 5/18 526/160 |
| 2019/0169335 A1 * | 6/2019 | Savatsky | B01J 8/1836 |
| 2019/0218318 A1 * | 7/2019 | Brandl | C08F 210/02 |
| 2019/0218319 A1 * | 7/2019 | Pannell | C08K 5/01 |
| 2019/0284310 A1 * | 9/2019 | Pannell | C08F 2/01 |
| 2019/0330391 A1 * | 10/2019 | Lynn | C08F 10/02 |
| 2020/0010585 A1 * | 1/2020 | Locklear | C08F 2/01 |
| 2020/0031964 A1 * | 1/2020 | Pannell | C08F 210/16 |
| 2020/0071436 A1 * | 3/2020 | Silva | C08F 210/16 |
| 2020/0071437 A1 * | 3/2020 | Stevens | B01J 8/1827 |
| 2020/0087422 A1 * | 3/2020 | Hagadorn | C08F 2/00 |
| 2020/0362064 A1 * | 11/2020 | Ding | C08F 2/34 |
| 2020/0398258 A1 * | 12/2020 | Greco | C08F 4/6228 |
| 2021/0040249 A1 * | 2/2021 | Borse | C08F 210/04 |
| 2021/0047442 A1 * | 2/2021 | Szul | C08F 2/34 |
| 2021/0070902 A1 * | 3/2021 | Liu | C08J 5/18 |
| 2021/0130507 A1 * | 5/2021 | Savatsky | C08F 210/14 |
| 2021/0147591 A1 * | 5/2021 | Borse | C08F 4/65916 |
| 2021/0147661 A1 * | 5/2021 | Lief | C08F 110/02 |
| 2021/0179753 A1 * | 6/2021 | Liu | B29C 55/28 |

FOREIGN PATENT DOCUMENTS

| | | |
|---|---|---|
| WO | 2006007046 | 1/2006 |
| WO | 2006049857 | 5/2006 |
| WO | 2006138007 | 12/2006 |
| WO | 2009059969 | 5/2009 |
| WO | 2011075258 | 6/2011 |
| WO | 2015076928 | 5/2015 |
| WO | 2017132092 | 8/2017 |

OTHER PUBLICATIONS

Mendelson, High-Density Polyethylene Melt Elasticity—Some Anomalous Observations on the Effects of Molecular Structure, Journal of Applied Polymer Science, Apr. 1975, pp. 1061-1078, vol. 19, Issue 4.

Wild, Determination of Branching Distributions in Polyethylene and Ethylene Copolymers, Journal of Polymer Science: Polymer Physics Edition, 1982, p. 441, vol. 20.

* cited by examiner

POLYETHYLENE COPOLYMER RESINS AND FILMS

FIELD

Polyethylene copolymer, film, article, and methods.

INTRODUCTION

WO 2006/007046 A2 to John F. Szul, et al., relates to methods for producing polymers with control over composition distribution. WO 2006/138007 A1 to Rainer Kolb, et al., relates to single catalyst low, medium and high density polyethylenes. U.S. Pat. No. 8,227,552 B2 and U.S. Pat. No. 8,497,329 B2, both to Rainer Kolb, et al., relate to methods of controlling polymer properties. US 2016/0297907 A1 to Mark G. Goode, et al., relates to methods for controlling polymer properties. WO 2017/132092 A1 to Cliff R. Mure, et al., relates to a polyolefin film with improved toughness.

SUMMARY

We sought an ethylene/alpha-olefin copolymer that can be made into a blown film characterized by enhanced (increased) bubble stability, i.e., decreased bubble instability.

Our technical solution comprises an ethylene/alpha-olefin copolymer that can be synthesized in a fluidized-bed, gas phase polymerization (FB-GPP) reactor and made into a blown film. The ethylene/alpha-olefin copolymer is characterized by a bubble stability-effective combination of properties comprising density, melt flow ratio ("$I_{21}/I_5$"), and melt storage modulus G' (G"=3,000 Pa). The synthesis in the FB-GPP reactor is characterized by a property-imparting-effective combination of operating conditions comprising reactor bed temperature and H2/C2 gas molar ratio. An embodiment of the blown film consisting essentially of the ethylene/alpha-olefin copolymer is characterized by enhanced (increased) bubble stability, i.e., decreased bubble instability. The embodiment of the film consisting essentially of the ethylene/alpha-olefin copolymer may be made or fabricated without internal bubble cooling (IBC) by any suitable method, including high stalk film blowing without IBC, and may optionally contain zero, one or more film additives. A method of making the ethylene/alpha-olefin copolymer. A film comprising the ethylene/alpha-olefin copolymer. A method of making the film. A manufactured article comprising the film.

DETAILED DESCRIPTION

The Summary and Abstract are incorporated here by reference.

Melt elasticity of a thermoplastic polymer can be thought of as the behavior of a melt of the polymer during a shaping process such as extrusion or film formation. It is one of the determinants of viscoelastic melt behavior, wherein viscosity decreases with increasing shear rate. Unsatisfactory melt elasticity may undesirably cause die swell during extrusion or problems with bubble stability during film blowing. A measure of, or proxy for, melt elasticity used herein is a melt storage modulus (G') value that is measured using DMA (Dynamic Mechanical Analysis) on polymer melts at 190° C. perform small-strain (10%) oscillatory shear at varying frequency from 0.02 radian per second (rad/s) to about 200 rad/s using an ARES-G2 Advanced Rheometric Expansion System, from TA Instruments, with parallel-plate geometry to obtain the G' (G"=3,000 Pa) value in pascals of melt storage modulus (G') at a dynamic frequency where loss modulus (G") is equal to 3,000 Pascals.

Some inventive embodiments are described below as numbered aspects for easy cross-referencing. Additional embodiments are described elsewhere herein.

Aspect 1. An ethylene/alpha-olefin copolymer characterized by a density from 0.947 to 0.954 gram per cubic centimeter (g/cm³), measured according to ASTM D792-13, Method B; a flow index ("$I_{21}$") from 8.5 to 12.4 grams per 10 minutes (g/10 min.), measured according to ASTM D1238-13 (190° C., 21.6 kg); a melt flow ratio ("$I_{21}/I_5$") from 20.5 to 24.4 measured according to ASTM D1238-13 (190° C., 21.6 kg, "$I_{21}$"; and 190° C., 5.0 kg, "$I_5$"); and a melt storage modulus G' (G"=3,000 Pa) value from 1950 to 2,155 Pascals (Pa) measured according to the Melt Storage Modulus Test Method, described later.

Aspect 2. The ethylene/alpha-olefin copolymer of aspect 1 having any one of limitations (i) to (x): (i) density from 0.947 to 0.949 g/cm³; (ii) density from 0.951 to 0.954 g/cm³; (iii) flow index ($I_{21}$) from 8.8 to 12.3 g/10 min., alternatively from 8.9 to 12.1 g/10 min., alternatively from 9.0 to 12.0 g/10 min., alternatively from 9.0 to 11.0 g/10 min., alternatively from 10.0 to 12.0 g/10 min., alternatively from 10.5 to 11.4 g/10 min.; (iv) a melt flow ratio ($I_{21}/I_5$) from 20.8 to 24.2, alternatively from 20.9 to 24.1, alternatively from 21.0 to 24.0, alternatively from 21.0 to 23.0, alternatively from 22.0 to 24.0, alternatively from 21.5 to 23.4; (v) a weight average molecular weight (Mw) greater than 100,000 grams per mole (g/mol), alternatively from 110,000 to 3,000,000 g/mol, alternatively from 100,000 to 1,000,000 g/mol, alternatively from 1,000,010 to 2,900,000 g/mol; (vi) a molecular mass dispersity ($M_w/M_n$), DM, of greater than 25, alternatively from 26 to 50, alternatively from 26 to 40, alternatively from 27 to 35; (vii) melt storage modulus G' (G"=3,000 Pa) value from 2010 to 2,140 Pa, alternatively from 2,010 to 2,090 Pa, alternatively from 2,099 to 2,145 Pa; (viii) a combination of (i) and (iii); (ix) a combination of (i) and (iv); (x) a combination of (i) and (v); (xi) a combination of (i) and (vi) (xii) a combination of (i) and (vii); and (xiii) a combination of each of (i) to (vii) but one (i.e., any one of (i) to (vii) is absent).

Aspect 3. The ethylene/alpha-olefin copolymer of aspect 1 or 2 wherein the alpha-olefin is 1-butene or 1-hexene.

Aspect 4. A method of synthesizing the ethylene/alpha-olefin copolymer of any one of aspects 1 to 3, the method comprising contacting ethylene and the alpha-olefin with a reduced chromium oxide catalyst system in a fluidized bed, gas-phase polymerization (FB-GPP) reactor operating at a first reactor bed temperature (RBT1), a first average polymer residence time (avgPRT1), and a first ethylene partial pressure (C2P1) and receiving an ethylene (C2) feed, a comonomer (Cx) feed, a hydrogen (H₂) feed, and, optionally, an oxygen (O₂) feed wherein the feeds are characterized by a first H2/C2 gas molar ratio (H2/C2-1), a comonomer/ethylene gas molar ratio ("Cx/C2"), and a first O2/C2 gas volume ratio ("[O2/C2]1", vol/vol in ppmv); wherein RBT1 is from 104 to 108 degrees Celsius (° C.); avgPRT1 is from 1.70 to 3.10 hours, C2P1 is from 1,100 to 1,900 kilopascals (kPa); H2/C2-1 is from 0.01 to 0.10; Cx/C2 is from 0.0001 to 0.1, alternatively from 0.0002 to 0.05, alternatively from 0.0004 to 0.02; and O2/C2 is from 0.0000 to 0.163 volume/volume parts per million (ppmv); thereby synthesizing the ethylene/alpha-olefin copolymer in the FB-GPP reactor. The first reactor bed temperature RBT1 of from 104° to 108° C. and the first H2/C2-1 gas molar ratio from 0.01 to 0.10 is useful in the method of synthesizing the ethylene/alpha-olefin copolymer for obtaining the embodiment of the ethylene/alpha-olefin copolymer that satisfies Eq. 1 described earlier.

Aspect 5. The method of aspect 4 further comprising removing the ethylene/alpha-olefin copolymer from the FB-GPP reactor to give a removed ethylene/alpha-olefin copolymer. In some aspects the removed ethylene/alpha-olefin copolymer may be purged with an inert gas (e.g., $N_2$) to remove entrained hydrocarbons and treated with a stream of humidified nitrogen ($N_2$) gas to deactivate any residual amount of the reduced chromium oxide catalyst system. In some aspects the removed ethylene/alpha-olefin copolymer may be combined with one or more additives useful in polyethylene films.

Aspect 6. A film comprising, alternatively consisting essentially of, alternatively consisting of, the ethylene/alpha-olefin copolymer of aspect 1, 2 or 3. The embodiment of the film consisting essentially of the ethylene/alpha-olefin copolymer is characterized by enhanced (increased) bubble stability, i.e., decreased bubble instability. The embodiment of the film consisting essentially of the ethylene/alpha-olefin copolymer may be made or fabricated without internal bubble cooling (IBC) by any suitable method, including high stalk film blowing without IBC, such as by using a high stalk film blowing manufacturing line without (active) IBC equipment, and optionally may contain zero, one or more film additives, such as, for example, antioxidant(s) and/or catalyst neutralizer(s). In some aspects the film consists essentially of the ethylene/alpha-olefin copolymer, at least one antioxidant, and at least one catalyst neutralizer. Examples of the at least one antioxidant and at least one catalyst neutralizer are described later.

Aspect 7. A method of making the film of aspect 6, the method comprising restricting in one dimension the ethylene/alpha-olefin copolymer, thereby giving the film. The restricting in one dimension may comprise blowing a melt of the ethylene/alpha-olefin copolymer so as to form a blown film comprising, alternatively consisting essentially of, alternatively consisting of, the ethylene/alpha-olefin copolymer.

Aspect 8. A manufactured article comprising the film of aspect 6 and a substance in need of covering, wherein the film is disposed to at least partially cover the substance. Examples of substances in need of covering are paper, paperboard (e.g., cardboard), food, pharmaceutical compounds, and a stack of paperboard boxes (e.g., wherein the film is a shrink wrap used for wrapping a pallet stacked with paperboard boxes).

Definitions

As used herein, bubble stability is measured according to the methods described later.

Consisting essentially of, consist(s) essentially of, and the like. Partially-closed ended expressions that exclude anything that would affect the basic and novel characteristics of that which they describe, but otherwise allow anything else. In some aspects any one, alternatively each "comprising" or "comprises" may be replaced by "consisting essentially of" or "consists essentially of", respectively; alternatively by "consisting of" or "consists of", respectively.

Consisting of and consists of. Closed ended expressions that exclude anything that is not specifically described by the limitation that it modifies. In some aspects any one, alternatively each expression "consisting essentially of" or "consists essentially of" may be replaced by the expression "consisting of" or "consists of", respectively.

Dry. Generally, a moisture content from 0 to less than 5 parts per million based on total parts by weight. Materials fed to the reactor(s) during a polymerization reaction are dry.

Feeds. Quantities of reactants and/or reagents that are added or "fed" into a reactor. In continuous polymerization operation, each feed independently may be continuous or intermittent. The quantities or "feeds" may be measured, e.g., by metering, to control amounts and relative amounts of the various reactants and reagents in the reactor at any given time.

Film: claimed film properties are measured on 13 micrometers thick monolayer films.

Inert. Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Internal bubble cooling or IBC is an aspect of film blowing performed by actively using ancillary, special purpose IBC equipment such as that of US 2002/0150648 A1 to R. E. Cree.

Metallocene catalysts. Substantially single site or dual site catalytic molecules based on metal-cyclopentadienyl ligand complexes. Excluded from steps (a), (b1) to (b3), and (c) of the inventive methods and uses.

Post-metallocene catalysts. Substantially single site or dual site catalytic molecules based on metal-ligand complexes wherein the ligand is a substituted cyclopentadienyl or multidentate molecular anion. Excluded from steps (a), (b1) to (b3), and (c) of the inventive methods and uses.

Ziegler-Natta catalysts. Heterogeneous materials that enhance olefin polymerization reaction rates and typically are products that are prepared by contacting inorganic titanium compounds, such as titanium halides supported on a magnesium chloride support, with an activator. Excluded from steps (a), (b1) to (b3), and (c) of the inventive methods and uses.

Polymerization Method

In an illustrative pilot plant process for making the first ethylene/alpha-olefin copolymer, a fluidized bed, gas-phase polymerization reactor ("FB-GPP reactor") having a reaction zone dimensioned as 304.8 mm (twelve inch) internal diameter and a 2.4384 meter (8 feet) in straight-side height and containing a fluidized bed of granules of first ethylene/alpha-olefin copolymer. Configure the FB-GPP reactor with a recycle gas line for flowing a recycle gas stream. Fit the FB-GPP reactor with gas feed inlets and polymer product outlet. Introduce gaseous feed streams of ethylene and hydrogen together with alpha-olefin comonomer (e.g., 1-hexene) below the FB-GPP reactor bed into the recycle gas line. Control individual flow rates of ethylene ("C2"), hydrogen ("H2") and alpha-olefin (e.g., 1-hexene or "C6") to maintain a fixed comonomer to ethylene monomer gas molar ratio (Cx/C2, e.g., C6/C2) equal to a described value (e.g., 0.0050), a constant hydrogen to ethylene gas molar ratio ("H2/C2") equal to a described value (e.g., 0.0020), and a constant ethylene ("C2") partial pressure equal to a described value (e.g., 1,000 kPa). Measure concentrations of all gases by an in-line gas chromatograph to understand and maintain composition in the recycle gas stream. Maintain a reacting bed of growing polymer particles in a fluidized state by continuously flowing a make-up feed and recycle gas through the reaction zone. Use a superficial gas velocity of 0.49 to 0.67 meter per second (m/sec) (1.6 to 2.2 feet per second (ft/sec)). Operate the FB-GPP reactor at a total pressure of about 2344 to about 2413 kilopascals (kPa) (about 340 to about 350 pounds per square inch-gauge (psig)) and at a described first reactor bed temperature RBT1 (e.g., 105° C.). Maintain the fluidized bed at a constant height by withdrawing a portion of the bed at a rate equal to the rate of production of particulate first ethylene/alpha-olefin copolymer, which production rate may be from 10 to 20 kilograms per hour (kg/hr), alternatively 13 to 18 kg/hr. Remove the product first ethylene/alpha-olefin copolymer semi-continuously via a series of valves into a fixed volume chamber, wherein this removed first ethylene/alpha-olefin copolymer is purged to remove entrained hydrocarbons and treated with a stream of humidified nitrogen ($N_2$) gas to deactivate any trace quantities of residual polymerization catalyst. See also polymerization method described later.

Polymerization conditions are any variable or combination of variables that may affect a polymerization reaction in the GPP reactor or a composition or property of an ethylene/alpha-olefin copolymer product made thereby. The variables may include reactor design and size, catalyst composition and amount; reactant composition and amount; molar ratio of two different reactants; presence or absence of feed gases such as H2 and/or O2, molar ratio of feed gases versus reactants, absence or concentration of interfering materials (e.g., $H_2O$), absence or presence of an induced condensing agent (ICA), average polymer residence time in the reactor, partial pressures of constituents, feed rates of monomers, reactor bed temperature (e.g., fluidized bed temperature), nature or sequence of process steps, time periods for transitioning between steps. In performing an inventive method or use, variables other than that/those being described or changed by the inventive method or use may be kept constant.

Comonomer/ethylene gas molar ratio Cx/C2 of comonomer and ethylene being fed into the gas-phase polymerization (GPP) reactor may be from 0.0001 to 0.1, alternatively from 0.0002 to 0.05, alternatively from 0.0004 to 0.02.

Gas molar ratio of comonomer to ethylene ("Cx/C2 gas molar ratio") is the quantity of all alpha-olefin comonomer(s) ("Cx"), in moles, being fed in a gaseous or vaporous state into the GPP reactor divided by the quantity of ethylene monomer (C2), in moles, being fed in a gaseous state into the GPP reactor. The moles of comonomer and moles of ethylene used to calculate the Cx/C2 gas molar ratio values are measured by gas flow meters or other suitable means.

Ethylene partial pressure (e.g., C2P1) in the GPP reactor. From 690 to 2070 kilopascals (kPa, i.e., from 100 to 300 psia (pounds per square inch absolute)); alternatively from 830 to 1655 kPa (120 to 240 psia), alternatively from 1300 to 1515 kPa (190 to 220 psia). Alternatively, the partial pressure of ethylene may be from 690 to 3450 kilopascals (kPa, 100 to 500 pounds per square inch absolute (psia)), alternatively 1030 to 2070 kPa (150 to 300 psia), alternatively 1380 to 1720 kPa (200 to 250 psia), alternatively 1450 to 1590 kPa (210 to 230 psia), e.g., 1520 kPa (220 psia). 1.000 psia=6.8948 kPa.

Hydrogen to ethylene (H2/C2) gas molar ratios H2/C2-1 and H2/C2-2 in the GPP reactor are different and otherwise independently are from 0.010 to 0.100, alternatively from 0.011 to 0.094.

Induced condensing agent (ICA). An inert liquid useful for cooling materials in the polymerization reactor(s) (e.g., a fluidized bed reactor). In some aspects the ICA is a ($C_5$-$C_{20}$)alkane, alternatively a ($C_{11}$-$C_{20}$)alkane, alternatively a ($C_5$-$C_{10}$)alkane. In some aspects the ICA is a ($C_5$-$C_{10}$)alkane. In some aspects the ($C_5$-$C_{10}$)alkane is a pentane, e.g., normal-pentane or isopentane; a hexane; a heptane; an octane; a nonane; a decane; or a combination of any two or more thereof. In some aspects the ICA is isopentane (i.e., 2-methylbutane). The inventive method of polymerization, which uses the ICA, may be referred to herein as being an induced condensing mode operation (ICMO). Concentration in gas phase measured using gas chromatography by calibrating peak area percent to mole percent (mol %) with a gas mixture standard of known concentrations of ad rem gas phase components. Concentration may be from 1 to 10 mol %, alternatively from 3 to 8 mole %.

Oxygen ($O_2$) concentration relative to ethylene ($O_2$/C2, volume parts $O_2$ per million volume parts ethylene (ppmv)) in the GPP reactor. In some embodiments the [$O_2$/C2]1 is from 0.0000 to 0.20 ppmv, alternatively from 0.0001 to 0.200 ppmv, alternatively from 0.0000 to 0.183 ppmv, alternatively from 0.0000 to 0.163 ppmv.

The polymerization method uses a gas-phase polymerization (GPP) reactor, such as a stirred-bed gas phase polymerization reactor (SB-GPP reactor) or a fluidized-bed gas-phase polymerization reactor (FB-GPP reactor), to make the inventive ethylene/alpha-olefin copolymer. Such reactors and methods are generally well-known in the art. For example, the GPP reactor/method may employ the induced condensing agent and be conducted in condensing mode polymerization such as described in U.S. Pat. Nos. 4,453,399; 4,588,790; 4,994,534; 5,352,749; 5,462,999; and U.S. Pat. No. 6,489,408. The GPP reactor/method may be a fluidized-bed gas-phase polymerization reactor (FB-GPP reactor)/method as described in U.S. Pat. Nos. 3,709,853; 4,003,712; 4,011,382; 4,302,566; 4,543,399; 4,882,400; 5,352,749; 5,541,270; EP-A-0 802 202; and Belgian Patent No. 839,380. These SB-GPP and FB-GPP polymerization reactors and processes either mechanically agitate or fluidize by continuous flow of gaseous monomer and diluent the polymerization medium inside the reactor, respectively. Other reactors/processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421.

The polymerization conditions may further include one or more additives such as a chain transfer agent, a promoter, or a scavenging agent. The chain transfer agents are well known and may be alkyl metal such as diethyl zinc. Promoters are known such as in U.S. Pat. No. 4,988,783 and may include chloroform, $CFCl_3$, trichloroethane, and difluorotetrachloroethane. Scavenging agents may be a trialkylaluminum. Gas phase polymerizations may be operated free of (not deliberately added) scavenging agents. The polymerization conditions for gas phase polymerization reactor/method may further include an amount (e.g., 0.5 to 200 ppm based on all feeds into reactor) of a static control agent and/or a continuity additive such as aluminum stearate or polyethyleneimine. The static control agent may be added to the FB-GPP reactor to inhibit formation or buildup of static charge therein.

Start-up or restart of the GPP reactor may be illustrated with a fluidized bed, GPP reactor. The start-up of a recommissioned FB-GPP reactor (cold start) or restart of a transitioning FB-GPP reactor (warm start) includes a time period that is prior to reaching steady-state polymerization conditions of step (a). Start-up or restart may include the use of a polymer seedbed preloaded or loaded, respectively, into the fluidized bed reactor. The polymer seedbed may be composed of powder of a polyethylene such as a polyethylene homopolymer or the ethylene/alpha-olefin copolymer.

Start-up or restart of the FB-GPP reactor may also include gas atmosphere transitions comprising purging air or other unwanted gas(es) from the reactor with a dry (anhydrous) inert purge gas, followed by purging the dry inert purge gas from the FB-GPP reactor with dry ethylene gas. The dry inert purge gas may consist essentially of molecular nitrogen ($N_2$), argon, helium, or a mixture of any two or more thereof. When not in operation, prior to start-up (cold start), the FB-GPP reactor contains an atmosphere of air. The dry inert purge gas may be used to sweep the air from a recommissioned FB-GPP reactor during early stages of start-up to give a FB-GPP reactor having an atmosphere consisting of the dry inert purge gas. Prior to restart (e.g., after a change in seedbeds), a transitioning FB-GPP reactor may contain an atmosphere of unwanted ICA or other unwanted gas or vapor. The dry inert purge gas may be used to sweep the unwanted vapor or gas from the transitioning FB-GPP reactor during early stages of restart to give the FB-GPP reactor an atmosphere consisting of the dry inert purge gas. Any dry inert purge gas may itself be swept from the FB-GPP reactor with the dry ethylene gas. The dry ethylene gas may further contain molecular hydrogen gas such that the dry ethylene gas is fed into the fluidized bed reactor as a mixture thereof. Alternatively the dry molecular hydrogen gas may be introduced separately and after the atmosphere of the fluidized bed reactor has been transitioned to ethylene. The gas atmosphere transitions may be done prior to, during, or after heating the FB-GPP reactor to the reaction temperature of the polymerization conditions.

Start-up or restart of the FB-GPP reactor also includes introducing feeds of reactants and reagents thereinto. The reactants include the ethylene and the alpha-olefin. The reagents fed into the fluidized bed reactor include the molecular hydrogen gas and the induced condensing agent (ICA) and the chromium-based catalyst system.

In an embodiment the method uses a pilot scale fluidized bed gas phase polymerization reactor (Pilot Reactor) that comprises a reactor vessel containing a fluidized bed of a powder of ethylene/alpha-olefin copolymer, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, alpha-olefin, hydrogen, and oxygen being fed into the Pilot Reactor are monitored by an in-line gas chromatograph in the cycle loop in order to maintain specific concentrations that define and enable control of polymer properties. In some embodiments the gases are cooled, resulting in their temperature dropping below their dew point, at which time the Pilot Reactor is in condensing mode operation (CMO) or induced condensing mode operation (ICMO). In CMO, liquids are present downstream of the cooler and in the bottom head below the distributor plate. The chromium-based catalyst system may be fed as a slurry or dry powder into the Pilot Reactor from high pressure devices, wherein the slurry is fed via a syringe pump and the dry powder is fed via a metered disk. The catalyst system typically enters the fluidized bed in the lower ⅓ of its bed height. The Pilot Reactor further comprises a way of weighing the fluidized bed and isolation ports (Product Discharge System) for discharging the powder of ethylene/alpha-olefin copolymer from the reactor vessel in response to an increase of the fluidized bed weight as polymerization reaction proceeds.

In some embodiments the FB-GPP reactor is a commercial scale reactor such as a UNIPOL™ reactor or UNIPOL™ II reactor, which are available from Univation Technologies, LLC, a subsidiary of The Dow Chemical Company, Midland, Mich., USA.

Chromium-Based Catalyst System

The chromium-based catalyst system comprises a reduced chromium oxide catalyst compound and, optionally, one or more of a modifying agent, a reducing agent, an activator, and a support material. The reduced chromium oxide catalyst compound may comprise or be a reaction product prepared from an activated chromium oxide catalyst compound and a reducing agent, optionally modified by a silyl chromate catalyst compound. The chromium-based catalyst system may be unsupported, that is free of a support material. The support material differs from the activator and the chromium-based catalyst compound in at least one of function (e.g., reactivity), composition (e.g., metal content), and property such as porosity. Alternatively, the chromium-based catalyst system may further comprise a support material for hosting the chromium-based catalyst compound and/or an activator. The chromium-based catalyst compound of the chromium-based catalyst system may be activated by any suitable method, which may or may not employ an activator, and under any suitable activating conditions, as described later.

The chromium oxide catalyst compound comprises $CrO_3$ or any chromium compound convertible to $CrO_3$ under catalyst activating conditions. Compounds convertible to $CrO_3$ are disclosed in, for example, U.S. Pat. Nos. 2,825,721; 3,023,203; 3,622,251; and U.S. Pat. No. 4,011,382. Examples are chromic acetyl acetonate, chromic halide, chromic nitrate, chromic acetate, chromic sulfate, ammonium chromate, ammonium dichromate, and other soluble, chromium containing salts. Chromium oxide catalyst compounds include Philips-type catalyst compounds, commonly referred to as "inorganic oxide-supported $Cr^{+6}$" catalysts. A Philips-type catalyst compound may be formed by a process that includes impregnating a $Cr^{+3}$ compound into a silica support, followed by calcining the impregnated silica support under oxidizing conditions at 300° to 900° C., alternatively, 400° to 860° C. to give the Philips-type catalyst compound. Under these conditions, at least some of the $Cr^{+3}$ are converted to $Cr^{+6}$.

The silyl chromate catalyst compound may be a bis(trihydrocarbylsilyl) chromate or a poly(diorganosilyl) chromate. The bis(trihydrocarbylsilyl) chromate may be bis(triethylsilyl) chromate, bis(tributylsilyl) chromate, bis(triisopentylsilyl) chromate, bis(tri-2-ethylhexylsilyl) chromate, bis(tridecylsilyl) chromate, bis(tri(tetradecyl)silyl) chromate, bis(tribenzylsilyl) chromate, bis(triphenylethylsilyl) chromate, bis(triphenylsilyl) chromate, bis(tritolylsilyl) chromate, bis(trixylylsilyl) chromate, bis(trinaphthylsilyl) chromate, bis(triethylphenylsilyl) chromate, or bis(trimethylnaphthylsilyl) chromate. The poly(diorganosilyl) chromate may be polydiphenylsilyl chromate or polydiethylsilyl chromate. In some embodiments, the silyl chromate compound is bis(triphenylsilyl) chromate, bis(tritolylsilyl) chromate, bis(trixylylsilyl) chromate, or bis (trinaphthylsilyl) chromate; alternatively bis(triphenylsilyl) chromate. See U.S. Pat. Nos. 3,324,101; 3,704,287; and U.S. Pat. No. 4,100,105.

Supported catalyst compounds. The chromium-based catalyst compound, such as the chromium oxide catalyst compound, the silyl chromate catalyst compound, and/or the reduced chromium oxide catalyst compound, independently may be unsupported, i.e., free of a support material. Alternatively, the chromium-based catalyst compound, such as the chromium oxide catalyst compound, the silyl chromate catalyst compound, or the reduced chromium oxide catalyst compound, may be disposed on a support material. That is, the chromium-based catalyst system may comprise the chromium-based catalyst compound and support material. Typically, the supported reduced chromium oxide catalyst compound is made in situ by contacting a pre-activated and supported chromium oxide catalyst compound, optionally modified with a silyl chromate catalyst compound, with a reducing agent to give an activated and supported reduced chromium oxide catalyst compound.

Support material. The support material may be an inorganic oxide material. The terms "support" and "support material" are the same as used herein and refer to a porous inorganic substance or organic substance. In some embodiments, desirable support materials may be inorganic oxides that include Group 2, 3, 4, 5, 13 or 14 oxides, alternatively Group 13 or 14 atoms. Examples of inorganic oxide-type support materials are silica, alumina, titania, zirconia, thoria, and mixtures of any two or more of such inorganic oxides. Examples of such mixtures are silica-chromium, silica-alumina, and silica-titania.

The inorganic oxide support material is porous and has variable surface area, pore volume, and average particle size. In some embodiments, the surface area is from 50 to 1000 square meter per gram ($m^2/g$) and the average particle size is from 20 to 300 micrometers (μm). Alternatively, the pore volume is from 0.5 to 6.0 cubic centimeters per gram ($cm^3/g$) and the surface area is from 200 to 600 $m^2/g$. Alternatively, the pore volume is from 1.1 to 1.8 $cm^3/g$ and the surface area is from 245 to 375 $m^2/g$. Alternatively, the pore volume is from 2.4 to 3.7 $cm^3/g$ and the surface area is from 410 to 620 $m^2/g$. Alternatively, the pore volume is from 0.9 to 1.4 $cm^3/g$ and the surface area is from 390 to 590 $m^2/g$. Each of the above properties are measured using conventional techniques known in the art.

The support material may comprise silica, alternatively amorphous silica (not quartz), alternatively a high surface area amorphous silica (e.g., from 500 to 1000 $m^2/g$). Such silicas are commercially available from a number of sources including the Davison Chemical Division of W.R. Grace and Company (e.g., Davison 952 and Davison 955 products), and PQ Corporation (e.g., ES70 product). The silica may be in the form of spherical particles, which are obtained by a spray-drying process. Alternatively, MS3050 product is a silica from PQ Corporation that is not spray-dried. As procured, all of these silicas are not calcined (i.e., not dehydrated). Silica that is calcined prior to purchase may also be used as the support material.

Supported chromium compounds, such as, for example, supported chromium acetate, are commercially available and may be used as an embodiment of the chromium-based catalyst system. Commercial examples include Davison 957, Davison 957HS, and Davison 957BG products from Davison Chemical Division, and ES370 product from PQ Corp. The supported chromium compound may in the form of spherical particles, which are obtained by a spray-drying process. Alternatively, C35100MS and C35300MS products from PQ Corporation are not spray-dried. As procured, all of these silicas are not activated. Supported chromium compounds that are activated prior to purchase may be used as the supported chromium compound.

Prior to being contacted with a chromium oxide catalyst compound, the support material may be pre-treated by heating the support material in air to give a calcined support material. The pre-treating comprises heating the support material at a peak temperature from 350° to 850° C., alternatively from 400° to 800° C., alternatively from 400° to 700° C., alternatively from 500° to 650° C. and for a time period from 2 to 24 hours, alternatively from 4 to 16 hours, alternatively from 8 to 12 hours, alternatively from 1 to 4 hours, thereby making a calcined support material. In some aspects the support material is a calcined support material.

In some embodiments the supported chromium oxide catalyst system further comprises a silyl chromate compound as a modifying agent. As such, the silyl chromate compound may be added to a slurry of the activated (unsupported or supported) chromium oxide catalyst system in a non-polar aprotic solvent to give a slurry of a modified activated supported chromium oxide catalyst system. The solvent may be removed by heating, optionally under reduced pressure, according to the drying process described later.

Catalyst activation. Any one of the foregoing chromium oxide catalyst compounds or silyl chromate catalyst compound, whether unsupported or supported on an uncalcined or calcined support material, independently may be activated by heating in an oxidative environment (e.g., well-dried air or oxygen) at an activation temperature of from 300° C. or higher with the proviso that the maximum activation temperature is below that at which substantial sintering of the compounds and/or support material would occur. The activating gives an activated (unsupported or supported) chromium oxide catalyst compound and/or an activated (unsupported or supported) silyl chromate catalyst compound. For example to activate the Philips catalyst, a fluidized bed of the supported chromium oxide catalyst compound may be activated by passing a stream of dry air or oxygen therethrough, thereby displacing any water therefrom and converting at least some $Cr^{+3}$ compound to $Cr^{+6}$ compound. The maximum activation temperature may be from 300° to 900° C., alternatively 400° to 850° C., alternatively from 500° to 700° C., alternatively from 550° to 650° C. The activation time period may be from 1 to 48 hours, alternatively from 1 to 36 hours, alternatively from 3 to 24 hours, alternatively from 4 to 6 hours. All other things being equal, the higher the activation temperature used, the shorter the activation period of time to achieve a given level of activation, and vice versa. The resulting activated (unsupported or supported) chromium oxide catalyst system may be in the form of a powdery, free-flowing particulate solid.

The reduced chromium oxide catalyst compound. An activated (unsupported or supported) reduced chromium oxide catalyst compound and system may be prepared from the activated (unsupported or supported) chromium oxide catalyst system. In one embodiment, the activated (unsupported or supported) chromium oxide catalyst system has been prepared from a calcined support material. The activated (unsupported or supported) chromium oxide catalyst system may be unmodified, alternatively may have been modified by the silyl chromate compound according to the modifying method described earlier. The preparing comprises agitating a slurry of the activated (unsupported or supported) chromium oxide catalyst system in a non-polar, aprotic solvent under an inert atmosphere, adding a reducing agent to the agitated slurry over a period of time (addition time), and then allowing the resulting reaction mixture to react under the inert atmosphere for a period of time (reaction time) to make the activated (unsupported or supported) reduced chromium oxide catalyst compound and system, which typically is supported on the support material, as a slurry in the non-polar, aprotic solvent. The inert atmosphere may comprise anhydrous $N_2$ gas, Ar gas, He gas, or a mixture thereof. The inert atmosphere may be at a pressure from 101 to 700 kilopascals (kPa). The temperature of the agitated slurry during the adding step may be from 30° to 80° C., alternatively from 40° to 60° C. The agitation may be performed at a rate less than 70 rotations per minute (rpm) and the addition time may be less than 20 minutes. Alternatively, the agitation rate may be greater than 70 rpm and the addition time may be less than 20 minutes. Alternatively, the agitation rate may be greater than 70 rpm and the addition time may be greater than 20 minutes. The agitation rate may be from 30 to 50 rpm, and the addition time may be from 20 to 80 minutes. The temperature of the reaction mixture during the allowing step may be from 20° to 80° C., alternatively from 20° to 60° C., alternatively from 20° to 40° C. The reaction time period may be from 0.08 to 2 hours.

The reducing agent may be an organoaluminum compound, such as an aluminum alkyl or an alkyl aluminum alkoxide. The alkyl aluminum alkoxide may be of formula $R_2AlOR$, wherein each R is independently an unsubstituted ($C_1$-$C_{12}$)alkyl group, alternatively unsubstituted ($C_1$-$C_{10}$) alkyl group, alternatively unsubstituted ($C_2$-$C_8$)alkyl group, alternatively unsubstituted ($C_2$-$C_4$)alkyl group. Examples of the alkyl aluminum alkoxides are diethyl aluminum methoxide, diethyl aluminum ethoxide, diethyl aluminum propoxide, dimethyl aluminum ethoxide, di-isopropyl aluminum ethoxide, di-isobutyl aluminum ethoxide, methyl ethyl aluminum ethoxide and mixtures thereof. In one aspect the reducing agent is diethyl aluminum ethoxide (DEAIE).

The non-polar, aprotic solvent may be an alkane, or a mixture of alkanes, wherein each alkane independently has from 5 to 20 carbon atoms, alternatively from 5 to 12 carbon atoms, alternatively from 5 to 10 carbon atoms. Each alkane independently may be acyclic or cyclic. Each acyclic alkane independently may be straight chain or branched chain. The acyclic alkane may be pentane, 1-methylbutane (isopentane), hexane, 1-methylpentane (isohexane), heptane, 1-methylhexane (isoheptane), octane, nonane, decane, or a mixture of any two or more thereof. The cyclic alkane may be cyclopentane, cyclohexane, cycloheptane, cyclooctane, cyclononane, cyclodecane, methycyclopentane, methylcyclohexane, dimethylcyclopentane, or a mixture of any two or more thereof. The non-polar, aprotic solvent may be a mixture of at least one acyclic alkane and at least one cyclic alkane.

Thereafter, the slurry of the activated (unsupported or supported) reduced chromium oxide catalyst compound and system may be dried to remove the non-polar, aprotic solvent. The drying comprises heating the slurry, optionally under reduced pressure, and in an environment that excludes oxidizing contaminants such as air or oxygen. The drying process transitions the activated (unsupported or supported) reduced chromium oxide catalyst compound and system from a viscous slurry to a partially dried slurry or mud to a free-flowing powder. Helical ribbon agitators may be used in vertical cylindrical blenders to accommodate the varying mixture viscosities and agitation requirements. Drying may be conducted at pressures above, below, or at normal atmospheric pressure as long as contaminants such as oxygen are strictly excluded from the activated (unsupported or supported) reduced chromium oxide catalyst compound and system. Drying temperatures may range from 0° to 100° C., alternatively from 40° to 85° C., alternatively from 55° to 75° C. Drying times may be from 1 to 48 hours, alternatively from 3 to 26 hours, alternatively from 5 to 20 hours. All other things being equal, the higher the drying temperature and/or lower the drying pressure, the shorter the drying time, and vice versa. After drying, the activated (unsupported or supported) reduced chromium oxide catalyst compound and system may be stored under an inert atmosphere until use.

Activator. Also referred to as a co-catalyst, an activator is a compound that enhances the catalytic performance of a catalyst. Aluminum alkyls may be used as activators for reduced chromium oxide catalyst compounds. The aluminum alkyl may also be used to improve the performance of the activated (unsupported or supported) reduced chromium oxide catalyst compound and system. The use of an aluminum alkyl allows for variable control of side branching in the polymer product, and desirable catalyst productivities. The aluminum alkyl may be applied to the reduced chromium oxide catalyst compound directly before the latter is fed into the GPP reactor. Alternatively, the reduced chromium oxide catalyst compound and aluminum alkyl may be fed separately into the GPP reactor, wherein they contact each other in situ, which may shorten or eliminate any catalyst induction time. See U.S. Pat. No. 7,504,467 B2.

During the inventive method or use, the chromium-based catalyst system, once activated, may be fed into the GPP reactor as a dry powder, alternatively as a slurry in a non-polar, aprotic solvent, which is as described above.

Chromium oxide catalyst compounds and reduced chromium oxide catalyst compounds and methods of preparation thereof, as well as characteristics of the polymer products formed therefrom, are described in U.S. Pat. No. 6,989,344; US 2011/0010938 A1; US 2016/0297907 A1; or WO 2017/132092 A1.

In some embodiments the chromium-based catalyst system comprises the reduced chromium oxide catalyst system. In some embodiments the reduced chromium oxide catalyst system comprises ACCLAIM™ K-100 catalyst system, ACCLAIM™ K-110 catalyst system, or ACCLAIM™ K-120 catalyst system. The ACCLAIM™ catalyst systems are all available from Univation Technologies, LLC, Houston, Tex., USA.

The ACCLAIM™ K-100, K-110, and K-120 catalyst systems may be prepared on commercial scales as follows. The preparations varying slightly depending on a small differences in concentrations of aluminum (DEALE) used thereon in Part (B), described later. Part (A): activation of supported chromium oxide catalyst system as a powder. Charge a fluidized bed heating vessel with a quantity of a porous silica support containing about 5 wt % chromium acetate (Grade C35300MSF chromium on silica, produced by PQ Corporation), which amounts to about 1 wt % Cr content, having a particle size of about 82 micrometers (μm) and a surface area of about 500 $m^2$/g. Heat up the vessel contents at a rate of about 50° C. per hour under a dry nitrogen stream up to 200° C., and hold at that temperature for about 4 hours. Next, further heat up the vessel contents at a rate of about 50° C. per hour under dry nitrogen to 450° C., and hold at that temperature for about 2 hours. Replace the dry nitrogen stream with a stream of dry air, and heat the vessel contents at a rate of about 50° C. per hour to 600° C., and maintain at 600° C. for about 6 hours to give activated chromium oxide catalyst. Cool the activated catalyst dry air stream (at ambient temperature) to about 300° C., replace the dry air stream with a dry nitrogen stream and further cool from 300° C. to room temperature under the dry nitrogen stream (at ambient temperature). The resulting cooled, activated supported chromium oxide catalyst system is a powder. Store the powder under dry nitrogen atmosphere in a mixing vessel until used in Part (B).

Part (B) reduction of activated chromium oxide catalyst system to give ACCLAIM™ K-100, K-110, or K-120 catalyst system. For pilot scale, fit a vertical catalyst blender with a double helical ribbon agitator, and charge with about 0.86 kg of the powder form of the activated supported chromium oxide catalyst of Part (A) under an inert atmosphere. Add dried hexane or isopentane solvent (7.1 L solvent per kg of powder) to adequately suspend the powder and form a slurry. Agitate the slurry, warm to approximately 45° C., and add a 25 wt % solution of DEAIE (Akzo Nobel) in isopentane or hexane above the surface of the catalyst slurry at a rate so that the addition occurs over about a 40 minutes time period to obtain a selected wt % aluminum loading on the powder, wherein the wt % aluminum loading is different depending upon whether ACCLAIM™ K-100, K-110, or K-120 catalyst system is being prepared. Further agitate the resulting at a controlled rate for about 1 hour on a pilot scale or 2 hours on a commercial scale. Then substantially remove the solvent from the resulting reaction mixture by drying at a selected jacket temperature for about 16 to 21 hours. Select the jacket temperature to give a material temperature that lines out near a target of 61°, 64°, 71°, or 81° C. during the later hours of drying, typically 16 hours for pilot scale. As drying time goes on, apply a progressively stronger vacuum to the vessel. The reduced chromium oxide catalyst system comprising ACCLAIM™ K-100, K-110, or K-120 catalyst system is obtained as a dry, free-flowing powder, which is stored in a container under dry nitrogen pressure until used in a polymerization reaction.

Ethylene/Alpha-Olefin Copolymer

Inventive embodiments may be described by the following features of the ethylene/alpha-olefin copolymer.

Alpha-olefin. A compound of formula (I): $H_2C=C(H)-(CH_2)_x-CH_3$ (I), wherein subscript x is an integer of 3 or greater, or a combination of any two or more such compounds. Each of the two or more such compounds have a different value for subscript x than the other such compounds. When x is from 3 to 40, the alpha-olefin is a $(C_3-C_{40})$alpha-olefin, also depicted as a Cx alpha-olefin wherein x is from 3 to 40. In some embodiments the alpha-olefin is the $(C_3-C_{40})$alpha-olefin; alternatively a $(C_3-C_{30})$alpha-olefin; alternatively a $(C_3-C_{20})$alpha-olefin; alternatively a $(C_3-C_{10})$alpha-olefin; alternatively a $(C_3-C_8)$alpha-olefin; alternatively a $(C_4-C_8)$alpha-olefin; alternatively at least one of $(C_4)$alpha-olefin, $(C_6)$alpha-olefin, and $(C_8)$ alpha-olefin; alternatively at least one of $(C_4)$alpha-olefin and $(C_6)$alpha-olefin; alternatively at least one of $(C_4)$alpha-olefin and $(C_8)$alpha-olefin; alternatively at least one of $(C_6)$alpha-olefin and $(C_8)$alpha-olefin; alternatively $(C_4)$alpha-olefin; alternatively $(C_6)$alpha-olefin; alternatively $(C_8)$ alpha-olefin; alternatively $(C_3)$alpha-olefin; alternatively $(C_3)$alpha-olefin, in combination with 1,4-butadiene. Examples of the alpha-olefin are 1-propene ($(C_3)$alpha-olefin), 1-butene ($(C_4)$alpha-olefin), 1-hexene ($(C_6)$alpha-olefin), or 1-octene ($(C_8)$alpha-olefin); alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene. The alpha-olefin used as a comonomer to make the first ethylene/alpha-olefin copolymer may be the same as the alpha-olefin used as the second comonomer to make the second ethylene/alpha-olefin copolymer. In some embodiments the alpha-olefin is 1-butene, alternatively 1-hexene.

Ethylene. A compound of formula $H_2C=CH_2$. A polymerizable monomer.

Ethylene/alpha-olefin copolymer. A macromolecule, or collection of macromolecules, composed of repeat units wherein 50 to <100 mole percent (mol %), alternatively 70 to 99.99 mol %, alternatively 80 to 99.9 mol % of such repeat units are derived from ethylene monomer, and from >0 to 50 mol %, alternatively from 0.01 to 30 mol %, alternatively 0.1 to 20 mol % of the remaining repeat units are comonomeric units derived from at least one alpha-olefin; or collection of such macromolecules.

Film

The film. The film may be unembossed or embossed. The film may be tailored for specific uses by adjusting thickness of the film, combination with other films or additives, or not. The film may be a monolayer film. In some aspects the film has a thickness from 0.0102 to 0.254 mm (0.400 mil to 10 mils), alternatively from 0.01143 mm to 0.254 mm (0.450 mil to 10 mils), alternatively from 0.01143 mm to 0.127 mm (0.450 mil to 5.00 mils), alternatively from 0.01143 mm to 0.0762 mm (0.450 mil to 3.00 mils), alternatively from 0.0127 mm to 0.0635 mm (0.500 mil to 2.50 mils).

The film may be made using any extrusion or co-extrusion methods including blown, tentered, and cast film methods. The blown film may be made on a blown-film-line machine configured for making polyethylene films. The machine may be configured with a feed hopper in fluid communication with an extruder in heating communication with a heating device capable of heating a polyethylene in the extruder to a temperature of up to 500° C. (e.g., 430° C.), and wherein the extruder is in fluid communication with a die having an inner diameter of 20.3 centimeters (8 inches) and a fixed die gap (e.g., 1.778 millimeter gap (70 mils)), a blow up ratio of 2.5:1, and a Frost Line Height (FLH) of 76±10 centimeters (30±4 inches) from the die. Step (a) may be done in the feed hopper.

The film may be unoriented, uniaxially oriented, or biaxially oriented. The film may be oriented in the direction of extrusion (machine direction or MD), alternatively in the direction transverse to the direction of extrusion (transverse direction or TD). The film may be oriented by stretching or pulling a film in the MD to give a MD oriented film, simultaneously or followed by stretching or pulling the MD oriented film in the TD to give a film that is biaxially oriented in MD and TD.

The film may have one or more improved properties such as enhanced (increased) bubble stability, enhanced (increased) MD and/or TD Elmendorf Tear performance, enhanced (increased) MD tensile strength and/or TD tensile strength, enhanced (increased) dart impact performance, or a combination of any two or more thereof.

The film may be combined with one or more other film layers to make multilayer films or laminates.

The film is useful for making containers and wraps that have enhanced puncture resistance. Examples of such containers are bags such as ice bags and grocery bags. Examples of such wraps are stretch films, meat wraps, and food wraps.

The inventive copolymer is also useful in a variety of non-film related applications including in vehicle parts.

The following apply unless indicated otherwise. Alternatively precedes a distinct embodiment. ASTM means the standards organization, ASTM International, West Conshohocken, Pa., USA. Any comparative example is used for illustration purposes only and shall not be prior art. Free of or lacks means a complete absence of; alternatively not detectable. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included). Properties are measured using a standard test method and conditions for the measuring (e.g., viscosity: 23° C. and 101.3 kPa). Ranges include endpoints, subranges, and whole and/or fractional values subsumed therein, except a range of integers does not include fractional values. Room temperature: 23° C.±1° C.

EXAMPLES

Dart Impact Test Method: measured according to ASTM D1709-16a, Standard Test Methods for Impact Resistance of Plastic Film by the Free-Falling Dart Test Method, Method A. Method A employs a dart with a 38.10±0.13-mm (1.500±0.005-in.) diameter hemispherical head dropped from a height of 0.66±0.01 m (26.0±0.4 in.), This test method can be used for films whose impact resistances require masses of about 50 g or less to about 6 kg to fracture them, Results expressed in grams (g).

Density is measured according to ASTM D792-13, Standard Test Methods for Density and Specific Gravity (Relative Density) of Plastics by Displacement;, Method B (for testing solid plastics in liquids other than water, e.g., in liquid 2-propanol). Report results in units of grams per cubic centimeter (g/cm$^3$). In some aspects the density is from 0.89 to 0.98 g/cm$^3$, alternatively from 0.92 to 0.97 g/cm$^3$, alternatively 0.940 to 0.960 g/cm$^3$.

Elmendorf Tear Test Method: measured according to ASTM D1922-09, Standard Test Methods for Propagation Tear Resistance of Plastic Film and Thin Sheeting by Pendulum Method, Type B (constant radius). (Technically equivalent to ISO 6383-2.) Report results as normalized tear in cross direction (CD) or machine direction (MD) in gram-force (gf).

Flow Index (190° C., 21.6 kg, "$I_{21}$") Test Method: use ASTM D1238-13, Standard Test Method for Melt Flow Rates of Thermoplastics by Extrusion Platometer, using conditions of 190° C./21.6 kilograms (kg). Report results in units of grams eluted per 10 minutes (g/10 min.).

Flow Rate (190° C., 5.0 kg, "$FR_5$") Test Method: use ASTM D1238-13, using conditions of 190° C./5.0 kg. Report results in units of grams eluted per 10 minutes (g/10 min.).

Flow Rate Ratio: (190° C., "$FI_{21}/FI_5$") Test Method: calculated by dividing the value from the Flow Index $FI_{21}$ Test Method by the value from the Flow Index $FI_5$ Test Method.

Gel permeation chromatography (GPC) Method: Weight-Average Molecular Weight Test Method: determine $M_w$, number average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) Teflon filter to give the solvent. Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X+1} + \frac{a_{PS}+1}{a_X+1}\log M_{PS},$$

where subscript "X" stands for the test sample, subscript "PS" stands for PS standards, $a_{PS}$=0.67, $K_{PS}$=0.000175, and $a_x$ and $K_x$ are obtained from published literature. For polyethylenes, $a_x/K_x$=0.695/0.000579. For polypropylenes $a_x/K_x$=0.705/0.0002288. At each point in the resulting chromatogram, calculate concentration, c, from a baseline-subtracted DRI signal, $I_{DRI}$, using the following equation: c=$K_{DRI}I_{DRI}$/(dn/dc), wherein $K_{DRI}$ is a constant determined by calibrating the DRI, I indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/d Log(MW) on the y-axis versus Log(MW) on the x-axis to give a GPC chromatogram, wherein Log(MW) and dW/d Log(MW) are as defined above.

Film Puncture Test Method: ASTM D5748-95(2012), Standard Test Method for Protrusion Puncture Resistance of Stretch Wrap Film. Determines the resistance to puncture of a film as resistance to penetration of the film by a probe impinging the film at a standard speed such as 250 millimeters per minute (mm/min.). The probe is coated with a polytetrafluoroethylene and has an outer diameter of 1.905 cm (0.75 inch). The film is clamped during the test. The probe eventually penetrates or breaks the clamped film. The peak force at break, i.e., the maximum force, energy (work) to break or penetrate the clamped film, and the distance that the probe has penetrated at break, are recorded using mechanical testing software. The probe imparts a biaxial stress to the clamped film that is representative of the type of stress encountered by films in many product end-use applications. This resistance is a measure of the energy-absorbing ability of a film to resist puncture under these conditions.

Melt Storage Modulus Test Method: On polymer melts at 190° C. perform small-strain (10%) oscillatory shear at varying frequency from 0.02 radian per second (rad/s) to about 200 rad/s using an ARES-G2 Advanced Rheometric Expansion System, from TA Instruments, with parallel-plate geometry to obtain the G'(G"=3,000 Pa) value in pascals of melt storage modulus (G') at a dynamic frequency where loss modulus (G") is equal to 3,000 Pa.

Melt Flow Ratio (190° C., "$MI_{21}/MI_2$") Test Method: calculated by dividing the value from the Flow Index $FI_{21}$ Test Method by the value from the Melt Index $MI_2$ Test Method.

Melt Index (190° C., 2.16 kilograms (kg), "$MI_2$") Test Method: for ethylene-based (co)polymer is measured according to ASTM D1238-13, using conditions of 190° C./2.16 kg, formerly known as "Condition E" and also known as $MI_2$.

Optical Gloss Test Method: ASTM D2457-13, Standard Test Method for Specular Gloss of Plastic Films and Solid Plastics. Measure specular gloss using a glassometer at incident angles 20°, 45°, 60°, or 75°. Specular gloss is unitless.

Optical Haze Test Method: D1003-13, Standard Test Method for Haze and Luminous Transmittance of Transparent Plastics. Measure haze using a hazemeter. Express haze as percentage of luminous transmission which in passing through the film deviates from an incident beam by forward scattering.

1% or 2% Secant Modulus Test Method: measured according to ASTM D882-12, Standard Test Methods for Tensile Properties of Thin Plastic Sheeting. Used either 1% or 2% secant modulus in cross direction (CD) or machine direction (MD). Report results in megapascals (MPa). 1,000.0 pounds per square inch (psi)=6.8948 MPa.

Shear Thinning Index (SHI) Test Method: Perform small-strain (10%) oscillatory shear measurements on polymer melts at 190° C. using an ARES-G2 Advanced Rheometric Expansion System, from TA Instruments, with parallel-plate geometry to obtain the values of storage modulus (G'), loss modulus (G") complex modulus (G*) and complex viscosity ($\eta^*$) as a function of frequency (w). Obtain a SHI value by calculating the complex viscosities at given values of complex modulus, and calculating the ratio of the two viscosities. For example, using the values of complex modulus of 1 kilopascal (kPa) and 100 kPa, obtain the $\eta^*(1.0$ kPa) and $\eta^*(100$ kPa) at a constant value of complex modulus of 1.0 kPa and 100 kPa, respectively. The shear thinning index SHI(1/100) is defined as the ratio of the two viscosities $\eta^*(1.0$ kPa) and $\eta^*(100$ kPa), i.e. $\eta^*(1.0)/\eta^*(100)$.

Tan Delta Test Method: a dynamic mechanical analysis (DMA) method measured at 190° C. and 0.1000 radians per second (rad/s) using the following procedure: Perform small-strain (10%) oscillatory shear measurements on polymer melts at 190° C. using an ARES-G2 Advanced Rheometric Expansion System, from TA Instruments, with parallel-plate geometry to obtain the values of storage modulus (G'), loss modulus (G") complex modulus (G*) and complex viscosity ($\eta^*$) as a function of frequency ($\omega$). A tan delta ($\delta$) at a particular frequency ($\omega$) is defined as the ratio of loss modulus (G") to storage modulus (G') obtained at that frequency ($\omega$), i.e. tan $\delta$=G"/G'. The tan $\delta$ value at frequency ($\omega$) 0.1 radian/second is used.

Tensile Modulus Test Method: measured according to ASTM D882-12, Standard Test Methods for Tensile Properties of Thin Plastic Sheeting. Report results in cross direction (CD) as average strain at yield in percent (%) or average stress at yield in megapascals (MPa), or in machine direction (MD) as average strain at yield in percent (%). 1,000.0 pounds per square inch (psi)=6.8948 MPa.

Antioxidant 1: pentaerythritol tetrakis(3-(3,5-di-tert-butyl-4-hydroxyphenyl)propionate. Obtained as IRGANOX 1010 from BASF.

Antioxidant 2: tris(2,4-di-tert-butylphenyl)phosphite. Obtained as IRGAFOS 168 from BASF.

Catalyst Neutralizer 1: calcium stearate.

Catalyst Neutralizer 2: zinc stearate.

Chromium-based Catalyst system 1: the ACCLAIM™ K-120 catalyst system.

Comonomer 1: 1-butene. See later for C4/C2 gas molar ratio.

Comonomer 2: 1-Hexene. See later for C6/C2 gas molar ratio.

Ethylene ("C2"): See below later for partial pressure of C2.

Induced condensing agent 1 ("ICA1"): isopentane, used at a mole percent (mol %) concentration in the gas phase of a gas phase reactor relative to the total molar content of gas phase matter. Reported later.

Molecular hydrogen gas ("H2"): See later for H2/C2 gas molar ratio.

Molecular oxygen gas ("O2"): See later for O2/C2 gas volume ratio.

The polymerization reactor and method is the Pilot Reactor described earlier.

Ethylene/1-butene copolymer 1: target density is 0.948 to 0.949 g/cm$^3$ and target flow index ($I_{21}$) is 9 to 10 g/10 minutes.

Ethylene/1-hexene copolymer 1: target density is 0.948 to 0.949 g/cm$^3$ and target flow index ($I_{21}$) is 9 to 12 g/10 minutes.

Inventive Example 1: transitioning a copolymerization of ethylene and 1-butene.

Inventive Example 2: transitioning a copolymerization of ethylene and 1-hexene.

Polymerization Procedure: Runs began with ACCLAIM™ K-110 Catalyst and comonomer=1-hexene on Part G7, and followed the order G7, G8, G6, G5, G9, G1, G2. Runs were stopped on Part G2 due to a blockage in top of the cooler of the Pilot Reactor. After approximately 7 days, reactor was restarted with a carbon dioxide/TMA passivation (TMA is trimethylaluminum) and short bake at 108° C., and runs continued with comonomer=1-hexene, except with ACCLAIM™ K-100 Catalyst, from Part G2, G3, G4; then comonomer was transitioned to 1-butene and runs continued ACCLAIM™ K-100 Catalyst, H4, H3, H2, H1, H9, H7, H8, H6, H5. During all Parts target density is 0.948 to 0.949 g/cm$^3$ and target flow index ($I_{21}$) is 9 to 12 g/10 minutes.

Formulation and Pelletization Procedure: Each of the granular resin parts (G1-G9 and H1-H9) was separately mixed together with 1,300 parts per million weight/weight (ppm) of Antioxidant 1, 1,300 ppm Antioxidant 2, 1,500 ppm Catalyst Neutralizer 1, and 700 ppm Catalyst Neutralizer 2 in a ribbon blender, and then compounded into strand cut pellets using a twin-screw extruder ZSK40. The resulting pellets of each resin were tested for flow index ($I_{21}$), density, and melt storage modulus G' (G"=3,000 Pa) according to their aforementioned respective test methods. Results are reported later.

TABLE 1

Common operating parameters for IE1 and IE2.

| Reaction Constituent/Parameter | IE1 and IE2 |
|---|---|
| Pilot Reactor, gas phase polymerization | single, continuous-mode, fluidized bed |
| Starting seedbed = granular HDPE resin | Preloaded in reactor |
| Bed weight | 4o to 55 kg |
| Reactor Purging method | Anhydrous $N_2$ gas |
| Ethylene ("C2") partial pressure | 1379 kPa |
| Induced Condensing Agent 1 | 0.01 to 0.02 mol % isopentane |
| Cr-Based Catalyst System 1 | ACCLAIM™ K-110 (Parts G7, G8, G6, G5, G9, G1, G2) |
| K-110 Catalyst loading (Cr, wt %) | 0.843 |
| K-110 Al concentration (Al, wt %) | 1.392 |
| Cr-Based Catalyst System 2 | ACCLAIM™ K-100 (Parts G2, G3, G4, H4, H3, H2, H1, H9, H7, H8, H6, H5) |
| K-100 Catalyst loading (Cr, wt %)) | 0.843 |
| K-100 Al concentration (Al, wt %) | 1.392 |

HDPE is high density polyethylene.

TABLE 2

Reactor parameters and polymer properties for IE1 runs.

| Run No. | Bed Temp. (° C.) | Polymer Res. Time (hour) | H2/C2 (mol/mol) | O2/C2 (ppmv) | C4/C2 (mol/mol) | I21 (g/10 min.) | FMR (I21/I5) | Density (g/cm³) | G' (G" = 3,000 Pa) (Pa) |
|---|---|---|---|---|---|---|---|---|---|
| H1 | 109 | 2.91 | 0.010 | 0.0470 | 0.00959 | 9.03 | 18.2 | 0.9482 | 1953 |
| H2 | 109 | 2.81 | 0.099 | 0.0486 | 0.01100 | 12.18 | 18.6 | 0.9479 | 1840 |
| H3 | 109 | 1.64 | 0.010 | 0.0775 | 0.01138 | 12.17 | 18.2 | 0.9483 | 2006 |
| H4 | 107 | 1.78 | 0.079 | 0.0000 | 0.01145 | 10.27 | 19.7 | 0.9478 | 1949 |
| H5 | 102 | 2.89 | 0.020 | 0.1623 | 0.01743 | 11.93 | 21.0 | 0.9483 | 2259 |
| H6 | 100 | 2.96 | 0.100 | 0.0841 | 0.01480 | 8.93 | 23.5 | 0.9479 | 2162 |
| H7 | 100 | 1.68 | 0.010 | 0.1382 | 0.01612 | 9.07 | 23.3 | 0.9479 | 2366 |
| H8 | 100 | 1.66 | 0.099 | 0.0959 | 0.01638 | 11.92 | 22.8 | 0.9479 | 2246 |
| H9 | 104.5 | 2.41 | 0.055 | 0.0864 | 0.01287 | 10.48 | 20.4 | 0.9484 | 2097 |

TABLE 3

Reactor parameters and polymer properties for IE2 runs.

| Run No. | Bed Temp. (° C.) | Polymer Res. Time (hour) | H2/C2 (mol/mol) | O2/C2 (ppmv) | C6/C2 (mol/mol) | I21 (g/10 min.) | MFR5 (I21/I5) | Density (g/cm³) | G' (G" = 3,000 Pa) (Pa) |
|---|---|---|---|---|---|---|---|---|---|
| G1 | 109 | 3.03 | 0.010 | 0.0467 | 0.00413 | 9.01 | 18.7 | 0.9478 | 1957 |
| G2 | 109 | 3.12 | 0.099 | 0.0633 | 0.00400 | 12.08 | 18.4 | 0.9479 | 1802 |
| G3 | 109 | 1.74 | 0.010 | 0.0763 | 0.00410 | 12.03 | 18.2 | 0.9479 | 2009 |
| G4 | 107 | 1.74 | 0.079 | 0.0000 | 0.00393 | 10.18 | 19.7 | 0.9481 | 1929 |
| G5 | 102 | 3.08 | 0.020 | 0.1825 | 0.00701 | 12.00 | 21.3 | 0.9480 | 2232 |
| G6 | 100 | 2.91 | 0.099 | 0.1205 | 0.00675 | 9.10 | 23.6 | 0.9478 | 2152 |
| G7 | 100 | 1.72 | 0.010 | 0.1332 | 0.00630 | 9.00 | 23.3 | 0.9480 | 2238 |
| G8 | 100 | 1.59 | 0.098 | 0.1580 | 0.00638 | 12.26 | 22.2 | 0.9484 | 2226 |
| G9 | 104.5 | 2.34 | 0.053 | 0.0657 | 0.00550 | 10.46 | 21.1 | 0.9479 | 2090 |

The order of the Parts run is as follows: G7, G8, G6, G5, G9, G1, G2, G3, G4, H4, H3, H2, H1, H9, H7, H8, H6, H5.

Complex viscosity ($\eta^*$) in pascal-seconds (Pa·s) at 126 rad./s for resins G1 to G9: G1 1781, G2 1639, G3 1581, G4 1739, G5 1533, G6 1643, G7 1712, G8 1472, G9 1656; and for resins H1 to H9: H1 1762, H2 1642, H3 1523, H41684, H5 1477, H6 1735, H71587, H8 1512, H9 1638.

The elastic modulus is the DMS (Dynamic Mechanical Spectroscopy) G' at G"=3000 in units of Pascals. The data in Tables 2 and 3 were analyzed by JMP software and discovered to depend on four of five reactor variables investigated: reaction temperature; H2/C2 gas molar ratio ("H2/C2"); flow index ("FI"); and comonomer, whether 1-butene ("C4"=+1) or 1-hexene ("C6"=−1). The fifth variable, average residence time of resin product, does not show an effect. The oxygen add-back floats and is assumed to not affect the elastic modulus. The Cx/C2 gas molar ratio does not greatly affect elastic modulus based on the results. Three forms of the model are fit to an equation, with an $R^2$ of about 0.98. The equation can be expressed by: G' (G"=3000)=6247.4−40.64*(reactor bed temperature) −1666*(H2/C2)+16.11*(FI)+15.93*(C4 or C6), wherein symbol*indicates multiplication and symbol + indicates addition. In some aspects the method or use produces an ethylene/alpha-olefin copolymer described by the elastic modulus as defined by the equation.

Film Forming Procedure: Pellets of selected ones of resins G1 to G9 and H1 to H9 are melted at melt temperature described later, and separately blown into films using an Alpine 50 millimeter (mm) 25:1 length to diameter (L/D) dimensioned barrier single screw extruder, a 120 mm inner diameter die, a 1.2 mm die gap, without IBC (internal bubble cooling). The following properties of 12.7 micrometer (μm) thickness films were measured in ASTM laboratories according to ASTM standards: (a) bubble rating at standard output rate of 6.9 kilograms per hour-centimeter (kg/hour-cm, bubble rating STD); (b) a bubble rating at standard output rate with maximum line speed greater than 14.2 meters per minute (m/min., bubble rating MLS); and (c) bubble rating at maximum output rate (20% or more output rate, bubble rating MOR). Bubble ratings were scored on a scale from 1 to 5 as follows: 1. Film could not be made. 2. Film could be made but production of film had bubble instability. 3. Film could be made but production of film had slight bubble instability. 4. Film could be made with bubble stability. 5. Film could be made with very stable bubble. If the bubble rating is 3, 4, or 5, the resin passes the bubble stability test. If the bubble rating is 1 or 2, the resin fails the bubble stability test.

TABLE 4

Blown Film production and bubble stability ratings.

| Resin No. | Extruder speed (rpm) | Motor load (%) | Melt temp. (° F./° C.) | Die Press. (psi/MPa) | Bubble Rating STD | Bubble Rating MLS | Bubble Rating MOR |
|---|---|---|---|---|---|---|---|
| G2 | 95 | 65.0 | 397.9/203.3 | 5972/41.2 | 1 | NT | N/T |
| G3 | 92 | 65.2 | 400.1/204.5 | 5832/40.2 | 1 | NT | 2 |
| G7 | 97 | 70.3 | 411.3/210.7 | 6408/44.2 | 2 | NT | 1 |
| H1 | 95 | 65.0 | 399.7/204.3 | 6382/44.0 | 2 | NT | N/T |
| H2 | 93 | 63.5 | 394.5/201.4 | 6029/41.6 | 5 | 1 | 1 |
| H3 | 95 | N/r | N/r | N/r | 1 | NT | 1 |
| H4 | 92 | 66.2 | 397.4/203.0 | 6181/42.6 | 2 | 2 | N/T |
| H6 | 92 | 65.8 | 396.0/202.2 | 6173/42.6 | 5 | 3 | 1 |
| H8 | 95 | 65.0 | 393.8/201.0 | 5665/39.1 | 4 | 4 | 4 |
| H9 | 95 | 65.8 | 394.8/201.6 | 5916/40.8 | 3 | 4 | 1 |

MPa is megapascals; N/r is not recorded. N/T not tested.

The blown films from Table 4 are characterized by ASTM methods and the results are shown below in Table 5. CD means cross direction, MD means machine direction.

TABLE 5

Blown Film testing.

| Test | Resin H8 | Resin H9 | Resin H6 | Resin H2 |
|---|---|---|---|---|
| Secant Mod. 1% CD (psi) | 144930 ± 6670 | 147160 ± 4940 | 144230 ± 6920 | 140680 ± 12780 |
| Secant Mod. 1% MD (psi) | 126030 ± 10030 | 118820 ± 4700 | 145390 ± 3960 | 133020 ± 4410 |
| Avg. Tear CD (gf) | 47 ± 30 | 53 ± 30 | 32 ± 14 | 109 ± 29 |
| Normalized Tear CD (gf) | 81 | 99 | 57 | 200 |
| Avg. Tear MD (gf) | 11.3 ± 3.3 | 10.7 ± 3.6 | 14.7 ± 2.0 | 11.1 ± 3.7 |
| Normalized Tear MD (gf) | 19 | 21 | 26 | 20 |
| Break Stress CD (psi) | 5563 ± 957 | 6141 ± 1316 | 6562 ± 1740 | 5452 ± 1140 |
| Strain@break CD (%) | 391 ± 45 | 352 ± 58 | 342 ± 43 | 436 ± 54 |
| Stress@yield CD (psi) | 3729 ± 282 | 3899 ± 148 | 3866 ± 175 | 3533 ± 389 |
| Strain@yield CD (%) | 5.0 ± 0.4 | 5.4 ± 0.8 | 5.8 ± 0.9 | 5.0 ± 0.5 |
| Break Stress MD (psi) | 6449 ± 712 | 6470 ± 428 | 6428 ± 848 | 7468 ± 678 |
| Strain@break MD (%) | 255 ± 92 | 249 ± 53 | 313 ± 52 | 310 ± 29 |
| Stress@yield MD (psi) | 3855 ± 443 | 3800 ± 175 | 3818 ± 337 | 3603 ± 237 |
| Strain@Yield MD (%) | 5.7 ± 0.3 | 5.4 ± 0.3 | 6.7 ± 1.0 | 5.4 ± 0.9 |
| Dart Impact (g) | 134 | 155 | 170 | 144 |
| Film Puncture (ft*lbf/in3) | 69 ± 14 | 68 ± 6 | 61 ± 10 | 62 ± 11 |
| Optical Gloss (45°) | 14.5 ± 1.9 | 10.7 ± 1.2 | 14.3 ± 0.6 | 9.8 ± 1.2 |
| Optical Haze (%) | 53 ± 2 | 63 ± 3 | 60 ± 2 | 68 ± 4 |

From the film fabrication properties in Table 4, it appears that not all the resins were made into films at standard film extrusion conditions; other film extrusion conditions may be tried. The processability of the resins for making films is believed to be influenced by reactor conditions used to make the resins as well as resin parameters, including flow index, melt flow ratio and melt elasticity. The film properties in Table 5 are believed to be a function of resin structural values as well as the reactor conditions. Flow index is believed to have influenced dart impact values and melt flow ratio is believed to have impacted film gloss values. Film tensile properties, including tensile break stress, tensile yield stress, did not change significantly, probably due to the similar densities of the resins.

The invention claimed is:

1. An ethylene/alpha-olefin copolymer characterized by a density from 0.947 to 0.954 gram per cubic centimeter (g/cm$^3$), measured according to ASTM D792-13, Method B; a flow index ("$I_{21}$") from 8.5 to 12.4 grams per 10 minutes (g/10 min.), measured according to ASTM D1238-13 (190° C., 21.6 kg); a melt flow ratio ("$I_{21}/I_5$") from 20.9 to 24.1 measured according to ASTM D1238-13 (190° C., 21.6 kg, "$I_{21}$"; and 190° C., 5.0 kg, "$I_5$"); and a melt storage modulus G' (G"=3,000 Pa) value from 1950 to 2,155 Pascals (Pa) measured according to Melt Storage Modulus Test Method.

2. The ethylene/alpha-olefin copolymer of claim 1 having any one of limitations (i) to (x): (i) density from 0.947 to 0.949 g/cm$^3$; (ii) density from 0.951 to 0.954 g/cm$^3$; (iii) flow index ($I_{21}$) from 8.8 to 12.3 g/10 min.; (iv) a melt flow ratio ($I_{21}/I_5$) from 21.0 to 24.0; (v) a weight average molecular weight (Mw) greater than 100,000 grams per mole (g/mol); (vi) a molecular mass dispersity ($M_w/M_n$), $Đ_M$, of greater than 25; (vii) melt storage modulus G' (G"=3,000 Pa) from 2010 to 2,140 Pa; (viii) a combination of (i) and (iii); (ix) a combination of (i) and (iv); (x) a combination of (i) and (v); (xi) a combination of (i) and (vi) (xii) a combination of (i) and (vii); and (xiii) a combination of each of (i) to (vii) but one.

3. The ethylene/alpha-olefin copolymer of claim 1 wherein the alpha-olefin is 1-butene or 1-hexene.

4. A film comprising the ethylene/alpha-olefin copolymer of claim 1.

5. A method of making the film of claim 4, the method comprising restricting in one dimension the ethylene/alpha-olefin copolymer, thereby giving the film.

6. A manufactured article comprising the film of claim 4 and a substance in need of covering, wherein the film is disposed to at least partially cover the substance.

7. A method of synthesizing the ethylene/alpha-olefin copolymer of claim 1, the method comprising contacting ethylene and the alpha-olefin with a reduced chromium oxide catalyst system in a fluidized bed, gas-phase polymerization (FB-GPP) reactor operating at a first reactor bed temperature (RBT1), a first average polymer residence time (avgPRT1), and a first ethylene partial pressure (C2P1) and receiving an ethylene (C2) feed, a comonomer (Cx) feed, a hydrogen (H$_2$) feed, and, optionally, an oxygen (O$_2$) feed wherein the feeds are characterized by a first H2/C2 gas molar ratio (H2/C2-1), a comonomer/ethylene gas molar ratio ("Cx/C2"), and a first O2/C2 gas volume ratio ("[O2/C2]1", vol/vol in ppmv); wherein RBT1 is from 104 to 108 degrees Celsius (° C.); avgPRT1 is from 1.70 to 3.10 hours, C2P1 is from 1,100 to 1,900 kilopascals (kPa); H2/C2-1 is from 0.01 to 0.10; Cx/C2 is from 0.0001 to 0.1; and O2/C2 is from 0.0000 to 0.163 volume/volume parts per million (ppmv); thereby synthesizing the ethylene/alpha-olefin copolymer in the FB-GPP reactor.

8. The method of claim 7 further comprising removing the ethylene/alpha-olefin copolymer from the FB-GPP reactor to give a removed ethylene/alpha-olefin copolymer.

9. A film comprising an ethylene/alpha-olefin copolymer characterized by a density from 0.947 to 0.954 gram per cubic centimeter (g/cm$^3$), measured according to ASTM D792-13, Method B; a flow index ("$I_{21}$") from 8.5 to 12.4 grams per 10 minutes (g/10 min.), measured according to ASTM D1238-13 (190° C., 21.6 kg); a melt flow ratio ("$I_{21}/I_5$") from 20.5 to 24.4 measured according to ASTM D1238-13 (190° C., 21.6 kg, "$I_{21}$"; and 190° C., 5.0 kg, "$I_5$"); and a melt storage modulus G' (G"=3,000 Pa) value from 1950 to 2,155 Pascals (Pa) measured according to Melt Storage Modulus Test Method.

10. The film of claim 9 wherein the ethylene/alpha-olefin copolymer has any one of limitations (i) to (x): (i) density from 0.947 to 0.949 g/cm$^3$; (ii) density from 0.951 to 0.954 g/cm$^3$; (iii) flow index ($I_{21}$) from 8.8 to 12.3 g/10 min.; (iv) a melt flow ratio ($I_{21}/I_5$) from 21.0 to 24.0; (v) a weight average molecular weight (Mw) greater than 100,000 grams per mole (g/mol); (vi) a molecular mass dispersity ($M_w/M_n$), $Đ_M$, of greater than 25; (vii) melt storage modulus G' (G"=3,000 Pa) from 2010 to 2,140 Pa; (viii) a combination of (i) and (iii); (ix) a combination of (i) and (iv); (x) a combination of (i) and (v); (xi) a combination of (i) and (vi) (xii) a combination of (i) and (vii); and (xiii) a combination of each of (i) to (vii) but one.

11. The film of claim 9 wherein the alpha-olefin is 1-butene or 1-hexene.

12. A method of making the film of claim 9, the method comprising restricting in one dimension the ethylene/alpha-olefin copolymer, thereby giving the film.

13. A manufactured article comprising the film of claim 9 and a substance in need of covering, wherein the film is disposed to at least partially cover the substance.

* * * * *